United States Patent
Ponssard et al.

(10) Patent No.: US 8,965,053 B2
(45) Date of Patent: Feb. 24, 2015

(54) METHOD FOR REMOTELY DETERMINING AN ABSOLUTE AZIMUTH OF A TARGET POINT

(75) Inventors: Clément Ponssard, Paris (FR); Daniel Duclos, Paris (FR); Simon Gavillet, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 14/118,887

(22) PCT Filed: May 18, 2012

(86) PCT No.: PCT/EP2012/059229
§ 371 (c)(1),
(2), (4) Date: Nov. 19, 2013

(87) PCT Pub. No.: WO2012/159978
PCT Pub. Date: Nov. 29, 2012

(65) Prior Publication Data
US 2014/0105458 A1 Apr. 17, 2014

Related U.S. Application Data

(60) Provisional application No. 61/593,814, filed on Feb. 1, 2012.

(30) Foreign Application Priority Data

May 20, 2011 (FR) ...................................... 11 01567

(51) Int. Cl.
| G06K 9/36 | (2006.01) |
| G01C 1/04 | (2006.01) |
| G01C 1/06 | (2006.01) |
| G01C 17/00 | (2006.01) |
| G06T 7/00 | (2006.01) |

(52) U.S. Cl.
CPC .. *G01C 1/04* (2013.01); *G01C 1/06* (2013.01); *G01C 17/00* (2013.01); *G06T 7/0042* (2013.01)
USPC .......................................... 382/103; 382/291

(58) Field of Classification Search
USPC .......... 382/103, 151, 152, 190, 291; 701/301; 342/37, 359, 36, 149, 357.31, 465, 342/194, 152, 357.34, 25 C; 340/539.1, 340/436; 356/4.01; 348/135, 143, E07.085
See application file for complete search history.

(56) References Cited

U.S. PATENT DOCUMENTS

| 5,512,904 | A | * | 4/1996 | Bennett | 342/357.32 |
| 5,708,438 | A | * | 1/1998 | Tanaka et al. | 342/104 |
| 6,197,575 | B1 | * | 3/2001 | Griffith et al. | 435/288.4 |
| 7,417,537 | B2 | * | 8/2008 | Lee | 340/539.1 |
| 8,761,445 | B2 | * | 6/2014 | Shamir et al. | 382/103 |
| 2010/0268451 | A1 | * | 10/2010 | Choi | 701/201 |
| 2011/0043620 | A1 | * | 2/2011 | Svanholm et al. | 348/135 |

* cited by examiner

*Primary Examiner* — Sheela Chawan
(74) *Attorney, Agent, or Firm* — Blakely Sokoloff Taylor & Zafman

(57) ABSTRACT

The invention relates to a method and system for remotely determining an absolute azimuth of a target point (B) by ground means, via the creation of an image bank georeferenced in the absolute azimuth only from a first point ($P_1$) and the use of this image bank as an azimuth reference from a second point ($P_2$) having a visual environment at least in part the same as the visual environment of the first point ($P_1$).

15 Claims, 2 Drawing Sheets

US 8,965,053 B2

METHOD FOR REMOTELY DETERMINING AN ABSOLUTE AZIMUTH OF A TARGET POINT

GENERAL TECHNICAL FIELD AND PRIOR ART

The invention relates to the field of geolocation. More precisely, it relates to a process for remotely determining an absolute azimuth of a target point using ground means.

The remote determination of an absolute azimuth of a target point using ground means can be performed in different ways.

One solution consists in having a prior geo-referenced database such as a map or a digital terrain model (DTM). The target point is therefore associated with a point in the geo-referenced database, the coordinates of the target point being, and in particular its absolute azimuth, in relation to a given reference, and thus known.

In the absence of such a prior geo-referenced database, several solutions are known for obtaining an absolute direction reference point, i.e. by a reference direction in relation to a geocentric frame of reference such as the magnetic North:

the magnetic compass, the lack of precision of which, in addition to its high sensitivity to electromagnetic disturbances, prevent a precise determination of the heading;

stellar observation, which requires a clear sky and can only be used at night in the case of stars;

a precision apparatus, such as a North seeker, for example a gyrotheodolite device, which can be expensive, heavy and delicate to handle.

These restrictions have led to the development of remote determination techniques for remotely determining the coordinates of a target point using a relate azimuth reference, thus overcoming the aforementioned restrictions.

A first approach involves the use of landmarks, the coordinates of which are known in advance, and in relation to which a relative azimuth is determined in relation to a frame of reference centred on an observer. This approach can only be applied if a landmark is available near to the target and if its coordinates are known, in addition to those of the observer. In order to assure this is the case, the number of landmarks with known coordinates must be increased as far as possible, which involves the drawing up of a cartography or digital terrain model with the associated restrictions.

This approach is in particular restricted to a known environment as this requires the prior knowledge of landmark coordinates.

Another approach consists in storing an absolute azimuth reference in a mobile piece of equipment. During a first phase, this azimuth reference is acquired by a precision device, such as a North seeker, and then transmitted to the mobile piece of equipment.

During a second phase, this azimuth reference is stored in the mobile piece of equipment while the latter is moved by estimating the change in orientation that it has undergone by means of sensors, for example inertia sensors. An absolute azimuth of a target point is therefore determined according to this absolute azimuth reference.

High precision equipment allow for errors regarding the estimated position of the target not exceeding ten meters.

Unfortunately, equipment allowing for high precision is too heavy, bulky and expensive for integration into the mobile equipment currently used such as binoculars.

Moreover, the initial phase for estimating the reference (including the calibration of the sensor and convergence of filtering processes) takes several minutes and the quality of this reference degrades quickly during the second storage and exploitation phase, in particular when the mobile equipment is moved.

GENERAL PRESENTATION OF THE INVENTION

The invention proposes a solution to overcome at least one and preferably all of these disadvantages.

In particular, it aims at precisely and remotely determining an absolute azimuth of a target point using ground means via a simple piece of equipment, without the requirement of prior data regarding the target environment.

Moreover, the restrictions of the invention include ease of implementation with relatively inexpensive, robust and simple to use equipment.

To this effect, the invention relates to a method for creating an image bank geo-referenced in the absolute azimuth only from a first point, and the use of this image bank as an azimuth reference from a second point having a visual environment at least in part the same as the visual environment of the first point.

According to a first aspect, the invention therefore relates to a method for remotely determining an absolute azimuth of a target point, in which:

a first series of images is acquired by means of a first piece of equipment, comprising at least one image of a first visual environment from a first location, the location coordinates of which are known, the elements of said images are associated with absolute azimuth values in a frame of reference centred on said first location, a first image database is constituted, associated with the location coordinates of the first location, said first image database is transferred to a second piece of equipment, said second piece of equipment storing said first image database, a second series of images is acquired by means of said second piece of equipment, comprising at least one image of a second visual environment from a second location, the location coordinates of which are known and from which the target point is visible, at least one point of correspondence is determined between the first image database and at least one image of the second series of images, said at least one point of correspondence corresponding to a common element shared by both the first and second visual environment, an absolute azimuth is attributed to the common element in a frame of reference centred on the second location, a relative azimuth of the target point is determined in relation to said common element, in the frame of reference centred on the second location, an absolute azimuth of the target point is determined in the frame of reference centred on the second location by exploiting the absolute azimuth in the frame of reference centred on the second location attributed to the common element and the relative azimuth of the target point in relation to said element in the frame of reference centred on the second location.

Furthermore, the distance between the common element and the second location can be acquired to attribute the absolute azimuth to the common element in a frame of reference centred on the second location.

According to a second aspect, the invention also relates to a method for remotely determining the location coordinates of a target point, in which:

an absolute azimuth of a target point is determined in the frame of reference centred on a second location according to the method previously described, the distance between the second location and the target point is acquired, the location coordinates of the target point are determined by means of the absolute azimuth of the target point in the frame of reference centred on the second location, known coordinates of the second location and the distance between the second location and the target point.

Advantageously, the invention is complemented by the following characteristics, which can be implemented alone or in any combination technically possible:

the distances are determined by telemetry;

the point of correspondence between the image database and the second series of images is determined by the implementation of a broad-based stereo vision method;

the determination of a relative azimuth of the target point in relation to said common element in the frame of reference centred on the second location implements the analysis of at least one image of the second series of images;

the determination of the relative azimuth of the target point in relation to said common element, in the frame of reference centred on the second location implements an accelerometer and/or a rate gyro;

the location coordinates of the first and second location are determined by a satellite positioning system.

According to a third aspect, the invention relates to a system for remotely determining an absolute azimuth of a target point, comprising:

a basic piece of equipment for implementing the steps of a method previously described in the form of a first piece of equipment and comprising image acquisition means; and a mobile piece of equipment for implementing the steps of a method previously described in the form of a second piece of equipment and comprising image acquisition means.

Furthermore, the system can comprise a receiver for a satellite positioning system.

The system can therefore comprise a basic piece of equipment for remotely determining an absolute azimuth of a target point, characterised in that it is suitable for implementing the steps of a method previously described in the form of a first piece of equipment and in that it comprises:

means for storing energy, means for acquiring images and a memory for acquiring a first series of images, comprising at least one image of a first visual environment from a first location;

means for determining the absolute azimuth and for processing images so as to associate the elements of said images with absolute azimuth values in a frame of reference centred on the first location and to constitute a first image database;

and in that it comprises means for transferring said first image database to the second piece of equipment.

Moreover, the basic piece of equipment can comprise a North seeker.

The system can also comprise a mobile piece of equipment for remotely determining the absolute azimuth of a target point, characterised in that it is suitable for implementing the steps of a method previously described in the form of a second piece of equipment and in that it comprises:

means for storing energy, reception means and a memory for receiving and storing a first image database, means for acquiring images to acquire a second series of images, comprising at least one image of a second visual environment of a second location, from which the point is visible, means for processing images and computing means for:

determining at least one point of correspondence between the first image database and at least one image of the second series of images and attributing an absolute azimuth to at least one element of the at least one image of the second series of images in a frame of reference centred on the second location, determining a relative azimuth of a target point in relation to said element in a frame of reference centred on the second location, determining an absolute azimuth of the target point in a frame of reference centred on the second location, by exploiting the absolute azimuth attributed to the at least one element of the at least one image of the second series of images and of the relative azimuth of the target in relation to said element.

Moreover, the mobile piece of equipment can comprise an accelerometer and/or a rate gyro, in addition to graphical and visual man-machine interface means enabling an operator of said second piece of equipment to intervene in remotely determining the absolute azimuth of a target point.

PRESENTATION OF THE FIGURES

Other characteristics, purposes and advantages of the invention are highlighted in the following description, which is provided for illustration purposes only and is not intended to limit the invention. This must be read with reference to the appended illustrations, among which:

DESCRIPTION OF ONE OR SEVERAL EMBODIMENTS AND IMPLEMENTATIONS

From a first location $P_1$, a first series of images of a first visual environment is acquired S1 using a first piece of equipment 1. This first series of images comprises at least one image and aims at covering all or part of the visual environment of the first location, i.e. the landscape surrounding the first location $P_1$. However, the images can be intended for only covering certain elements of this first visual environment, for example a noticeable element such as a mountain or simply the elements in the direction of a second location $P_2$. The first piece of equipment 1 therefore comprises the means required for this task, i.e. in particular the means for acquiring images such as a digital photographic device.

Preferably, these image acquisition means can acquire images from visible optic rays, however also from electromagnetic rays in other wavelength ranges such as infrared or ultraviolet.

The positioning of the first location $P_1$ is known, for example using a receiver of a satellite positioning system such as GPS. Such a receiver can make up part of the first piece of equipment 1 or be independent from the latter.

The first piece of equipment 1 also comprises elements for determining the absolute azimuth of elements of the first series of images in a frame of reference centred on the first location $P_1$.

The absolute azimuth of an element in a frame of reference centred on a location relates to an angle between
- a first straight line passing through said location (for example the first location $P_1$) and extending along a reference direction such as North, and
- a second straight line passing through said location (for example the first location $P_1$) and through said element.

Therefore, the first piece of equipment 1 can, for example, comprise a North seeker or any other means capable of procuring a reliable and accurate measurement.

Elements of said images of the first series of images are associated S2 with a corresponding absolute azimuth. These elements can, for example, be elements selected by an image analysis due to their characteristic, for example a high contrast or an identifiable contour line. Detection and extraction algorithms for visual features can be used. All pixels can therefore be associated with an absolute azimuth as required. This association of elements with their respective absolute azimuth is performed automatically.

Moreover, other sensors, for example an inclinometer, can be used to provide additional data with regard to the exposure conditions and which can also be associated with image elements.

The first piece of equipment 1 does not have to be light and/or fast insofar as it is not intended to be moved or used for sighting a target. This can be a piece of equipment 1 used in a preparation phase.

Figure 1:
FIG. 1 is an illustration of one embodiment of the invention.
Figure 2:
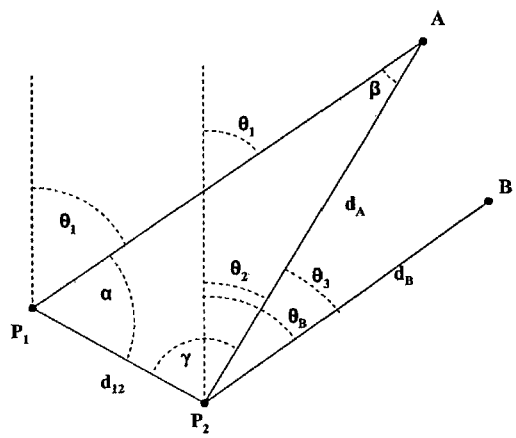
FIG. 2 is an outline illustrating one example of the geometric relationships exploited by the invention.
Figure 3A:
FIGS. 3a and 3b illustrate the possible components of a system according to the invention.

Such a piece of equipment can therefore be qualified as basic equipment. It can, for example, be supported by a tripod for improved stability. One example of such a basic piece of equipment capable of being used for implementing the steps of a method according to the invention in the form of a first piece of equipment is illustrated in FIG. 3a. The first piece of equipment 1 can therefore be a basic piece of equipment 1, preferably equipped with a memory, database transfer means, energy storage means and image acquisition and processing means.

A first database is therefore comprised S3 by means of the first piece of equipment 1 or an independent device such as a computer, to which the first piece of equipment 1 has transmitted the first series of images. This first database is constituted from the first series of images. The location coordinates of the first location $P_1$ are also associated to this first database and are integrated therein. This first database may be improved by error reduction methods, memory optimisation, pre-processing or image overlay.

Moreover, the database can be complemented by information relating to the conditions for acquiring the images that constitute this database, for example information on the roll and pitch obtained via the sensors of the first piece of equipment, such as an accelerometer. Image quality criteria may also be associated with the first database.

This first image database is then transferred S4 to a second piece of equipment 2 by means of a wired or wireless connection or by any other data transfer means such as a data support. The first piece of equipment 1 therefore comprises means for transferring said first image database to the second piece of equipment, this transfer however capable of being performed by another device such as a computer.

This second piece of equipment 2 is mobile and individual. It can therefore be considered as a mobile piece of equipment for remotely determining an absolute azimuth of a target point, suitable for implementing the steps of a method according to the invention in the form of a second piece of equipment.

The invention thus uses a system for remotely determining an absolute azimuth of a target point B comprising
- a basic piece of equipment 1 for implementing the steps of a method according to the invention in the form of a first piece of equipment 1 and comprising image acquisition means; and
- a mobile piece of equipment 2 for implementing the steps of a method according to the invention in the form of a second piece of equipment 2 and comprising image acquisition means.

Figure 3B:
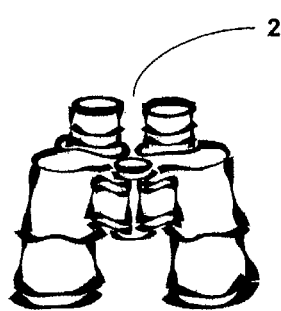
Figure 4:
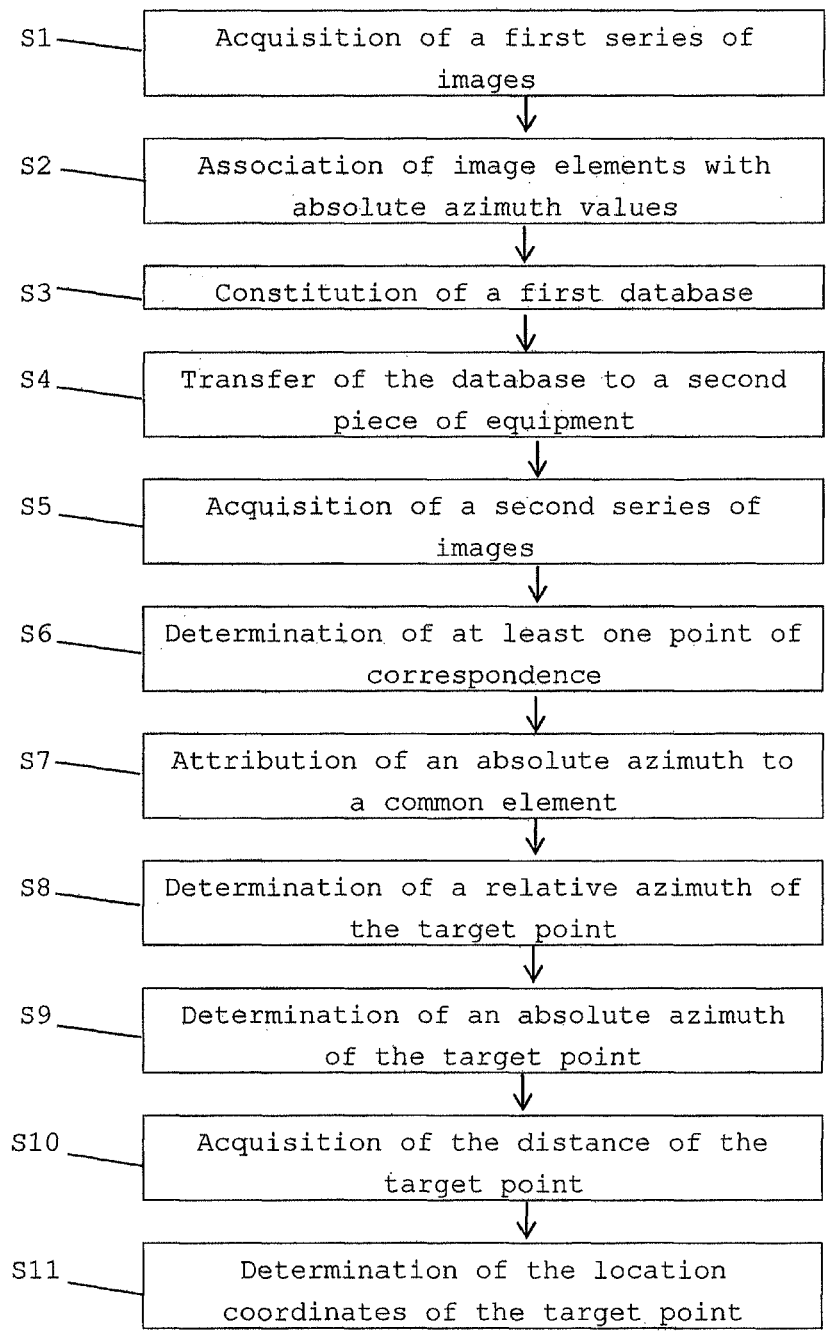
FIG. 4 is a diagram illustrating the steps of a method according to the invention.

A user of the second piece of equipment 2 can therefore move with the second piece of equipment to a second location $P_2$, from which the target point B is visible. For illustration purposes only, one example of such a piece of mobile equipment is represented by FIG. 3b, in which the second piece of equipment 2 takes the form of binoculars, preferably equipped with a memory, means for receiving said first database, energy storage means and means for acquiring and processing images. Following the example of the first piece of equipment 1, the spectrum of electromagnetic rays taken into account can be wider or more restricted than the spectrum of visible optic and infrared waves.

The location coordinates of the second location $P_2$ are known. The position of the second location $P_2$ can in particular be determined by means of a receiver of a satellite positioning system such as GPS, and may be integrated into the second piece of equipment 2 or be independent from the latter.

A second series of images is then acquired S5 by means of the second piece of equipment 2. This second series of images comprises images of a second visual environment from the second location $P_2$.

At least one image of the second series of images is therefore compared to the first image database so as to determine S6 at least one point of correspondence, corresponding to a common element A shared by the first and second visual environments. Said point of correspondence is determined by the implementation of a broad-based stereo vision method.

The search for a point of correspondence begins with the extraction of features in the images. The extraction of these features is preferably performed automatically by detection and extraction algorithms for visual features such as the SIFT (Scale-Invariant Feature Transform) or even SURF (Speeded Up Robust Features). Descriptors of the image features are thus obtained.

Once these features have been extracted from the images, they undergo data mapping based on their descriptors which have just been calculated. The data mapping of features can, for example, call for robust optimisation and various dedicated algorithms.

The descriptors of a common element shared by two images are more or less invariant according to the change in perspective and can be identified by their similarity, for example their low Euclidean distance. Furthermore, the point matches must be compatible with an epipolar geometry determined by the images taken from two different locations. To this end, a fundamental matrix is determined, which draws up a correspondence of the same element according to two different image shots.

The identification of a common element can also use shape recognition algorithmic techniques based on geometric or radiometric information extracted from the common element and its environment in the first series of images and in the second series of images.

The performances of such a data mapping operation can be improved by means of sensors installed on-board the second piece of equipment 2, providing information on the orientation of the second piece of equipment. These on-board sensors can, for example, be magnetic compasses or inertia sensors. As explained hereinabove, these sensors do not provide high levels of accuracy. Nevertheless, they obtain indications for the data mapping step, thus enabling the data mapping process to be accelerated and/or false positives to be avoided.

Other data can be used to improve data mapping. For example, the known coordinates of the first location $P_1$ and of the second location $P_2$ can be put to use. A distance of a feature can be obtained by telemetry upon request from the second piece of equipment 2. If the first piece of equipment 1 and the second piece of equipment 2 are equipped with an inclinometer, the incline data for the images can also be used.

The operator of the second piece of equipment 2 can also be used, via a suitable man-machine interface procedure, to validate the result of the search for the common element or even to propose a common element or choose the latter from a list of potentials automatically drawn up according to the aforementioned method.

To this effect, the second piece of equipment 2 can comprise graphical and visual man-machine interface means enabling the operator of said second piece of equipment to intervene in the method according to the invention. These interface means can, for example, take the form of a tactile or normal screen, possible accompanied with controls such as buttons.

The knowledge of the respective position coordinates of the first location $P_1$ and the second location $P_2$ allows for the transformation of an absolute azimuth of an element in the first frame of reference centred on the first location $P_1$ to an absolute azimuth of the same element in a second frame of reference centred on the second location $P_2$.

Once at least one common element A has been identified, shared by the first and second visual environment, an absolute azimuth $\theta_1$ associated with said common element A or deduced from neighbouring elements, in the frame of reference centred on the first location $P_1$, is used so as to attribute S7 an absolute azimuth $\theta_2$ in a frame of reference centred on the second location $P_2$ of said common element A.

To this end, the angle $\beta$ between the straight line connecting the first location $P_1$ and the common element A and the straight line connecting the first location $P_1$ and the common element A can be determined from the calculation and decomposition of the fundamental matrix previously determined containing the information relating to the relationship between the two images.

However, as the sum of the angles of a triangle is equal to $\pi$, $\beta=\theta_1-\theta_2$, $\theta_2$ can be deduced through the knowledge of $\beta$ and $\theta_1$. An absolute azimuth $\theta_2$ can therefore be attributed in a frame of reference centred on the second location $P_2$.

Another method can also be used to replace, or preferably complement this method in order to improve the accuracy of the attribution of an absolute azimuth $\theta_2$ in a frame of reference centred on the second location $P_2$. This involves acquiring the distance $d_A$ between the common element A and the second location $P_2$. Moreover, insofar as the location coordinates of $P_1$ and $P_2$ are known, the angle $\alpha$ between the straight line passing through the first location $P_1$ and the common element A and the straight line passing through the first location $P_1$ and the second location $P_2$ can be determined, in addition to the distance $d_{12}$ between the first location $P_1$ and the second location $P_2$.

By also knowing an angle $\alpha$ and two sides $d_A$ and $d_{12}$ of the triangle $P_1AP_2$, the angle $\gamma$ belonging to this triangle and corresponding to the angle between the straight line passing through the first location $P_1$ and the second location $P_2$ and the straight line connecting the second point $P_2$ to the common element A, can be calculated. The angle made by the straight line passing through the first location $P_1$ and the second location $P_2$ with the reference azimuth is therefore equal to $\gamma-\theta_2$.

However, this angle $\gamma-\theta_2$ can be determined from the knowledge of the respective location coordinates of the first location $P_1$ and the second location $P_2$, by combining this with the knowledge of a reference absolute azimuth for the entire frame of reference in which the location coordinates of the first location $P_1$ and second location $P_2$ are expressed. Often, said location coordinates are expressed in latitude and longitude and the reference absolute azimuth for the entire frame of reference is the North.

Once the angle $\gamma-\theta_2$ has been determined, the absolute azimuth $\theta_2$ of the common element A is deduced, in the frame of reference centred on $P_2$.

The two aforementioned methods can be used alone or preferably combined for improved accuracy.

The absolute azimuth $\theta_2$ attributed to the common element A in the frame of reference centred on $P_2$ establishes a reference for the orientation of the elements of the second visual environment in relation to the second location $P_2$. Therefore, only a relative azimuth $\theta_3$ of the target point B must be determined S8 in relation to a common element A in a frame of reference centred on $P_2$ to deduce an absolute azimuth $\theta_B$ of the target point B in a frame of reference centred on $P_2$.

This relative azimuth $\theta_3$ of the target point B can be determined by means of sensors such as an accelerometer and/or a rate gyro, to assess the angular travel of the second piece of equipment when said second piece of equipment 2 passes from an orientation in which the common element A is visible to an orientation in which the target point B is visible. Preferably, the second piece of equipment 2 comprises sighting means so that its orientation can be adjusted so that the sighting means of the second piece of equipment 2 can have an optical axis aligned with a sighting point, for example the common element A or the target point B.

Alternatively, or preferably as a complement, an image processing operation can also be implemented so as to assess this relative azimuth $\theta_3$ from the second series of images.

An absolute azimuth $\theta_B$ of the target point B centred on the second location $P_2$ can therefore be determined S9 by exploiting the absolute azimuth value $\theta_2$ in the frame of reference centred on the second location $P_2$ attributed to the common element A, and the relative azimuth $\theta_3$ of the target point B in relation to said element in the frame of reference centred on the second location $P_2$, for example by calculating the difference or the sum of the two quantities.

Once the absolute azimuth $\theta_B$ of the target point B centred on the second location $P_2$ has been determined, the location coordinates of the target point B can be determined remotely. In order to achieve this:

the distance $d_B$ between the second location $P_2$ and the target point B is acquired S10, the location coordinates of the target point B are determined S11 by means of the absolute azimuth $\theta_B$ of the target point B in the frame of reference centred on the second location $P_2$, known coordinates of the second location $P_2$ and the distance $d_B$ between the second location and the target point B.

Indeed, the acquisition of the distance $d_B$ between the second location $P_2$ and the target point B, associated with the prior knowledge of the absolute azimuth $\theta_B$ of the target point B in a frame of reference centred on the second location $P_2$, enables the location of the target point B to be determined in said frame of reference. By knowing the location coordinates of the second location $P_2$, only a change in frame of reference is required, for example to a geocentred frame of reference, to determine the location coordinates of the target point B, for example its longitude and latitude.

The invention therefore relates to remotely determining the absolute azimuth or location coordinates of a target point B in a precise manner and/or requiring less data than methods of the prior art presented hereinabove, and therefore its location coordinates to be deduced.

The invention claimed is:

1. Method for remotely determining an absolute azimuth of a target point (B) in which:

a first series of images is acquired (S1) by means of a first piece of equipment (1), comprising at least one image of a first visual environment from a first location ($P_1$), the location coordinates of which are known;

the elements of said images are associated (S2) with absolute azimuth values in a frame of reference centred on said first location ($P_1$);

a first image database is constituted (S3), associated with the location coordinates of the first location ($P_1$);

said first image database is transferred (S4) to a second piece of equipment (2), said second piece of equipment (2) storing said first image database;

a second series of images is acquired (S5) by means of said second piece of equipment (2), comprising at least one image of a second visual environment from a second location ($P_2$), the location coordinates of which are known and from which the target point (B) is visible;

at least one point of correspondence is determined (S6) between the first image database and at least one image of the second series of images, said at least one point of correspondence corresponding to a common element (A) shared by both the first and second visual environment;

an absolute azimuth ($\theta_2$) is attributed (S7) to the common element (A) in a frame of reference centred on the second location ($P_2$);

a relative azimuth ($\theta_3$) of the target point (B) is determined (S8) in relation to said common element (A), in the frame of reference centred on the second location ($P_2$);

an absolute azimuth ($\theta_B$) of the target point (B) is determined (S9) in the frame of reference centred on the second location ($P_2$) by exploiting the absolute azimuth ($\theta_2$) in the frame of reference centred on the second location ($P_2$) attributed to the common element (A) and the relative azimuth ($\theta_3$) of the target point (B) in relation to said element in the frame of reference centred on the second location ($P_2$).

2. A method according to claim 1, wherein the distance ($d_A$) between the common element (A) and the second location ($P_2$) is acquired to attribute the absolute azimuth ($\theta_2$) to the common element (A) in a frame of reference centred on the second location ($P_2$).

3. A method according to claim 2, wherein the distances ($d_A$, $d_B$) are determined by telemetry.

4. A method for remotely determining the location coordinates of a target point (B), wherein:

an absolute azimuth ($\theta_B$) of a target point (B) is determined in the frame of reference centred on a second location ($P_2$) according to claim 1 or 2;

the distance ($d_B$) between the second location ($P_2$) and the target point (B) is acquired (S10);

the location coordinates of the target point (B) are determined (S11) by means of the absolute azimuth ($\theta_B$) of the target point (B) in the frame of reference centred on the second location ($P_2$), known coordinates of the second location ($P_2$) and the distance ($d_B$) between the second location and the target point (B).

5. A method according to claim 1, wherein the point of correspondence between the image database and the second series of images is determined by the implementation of a broad-based stereo vision method.

6. A method according to claim 1, wherein the determination (S8) of a relative azimuth ($\theta_3$) of the target point (B) in relation to said common element (A) in the frame of reference centred on the second location ($P_2$) implements the analysis of at least one image of the second series of images.

7. A method according to claim 1, wherein the determination (S8) of the relative azimuth ($\theta_3$) of the target point (B) in relation to said common element (A) in the frame of reference centred on the second location ($P_2$) implements an accelerometer and/or a rate gyro.

8. A method according to claim 1, wherein the location coordinates of the first ($P_1$) and second ($P_2$) location are determined by a satellite positioning system.

9. A system for remotely determining an absolute azimuth of a target point (B), comprising:

a basic piece of equipment (1) in the form of a first piece of equipment including:

means for acquiring (S1) a first series of images in which at least one imaoe of a first visual environment is acquired from a first location ($P_1$), the location coordinates of which are known;

means for associating (S2) the elements of said images with absolute azimuth values in a frame of reference centred on said first location ($P_1$);

means for constituting (S3) a first image database associated with the loocation coordinates of the first location ($P_1$);

means for transferring(S4) said first image database to a mobile piece of equipment (2) said mobile piece of equipment (2) including:

a receiver configured to receive said first image database;

a memory configured to store said first image database;

said receiver further confioured to receive a second series of images wherein, at least one image of a second visual environment is acquired (S5) from a second location ($P_2$);

the location coordinates of which are known and from which the target point (B) is visible; and a computer configured to:

determine S6 at least one point of correspondence between the first image database and at least one image of the second series of images and attribute (S7) an absolute azimuth $\theta_2$ to at least one element of the at least one image of the second series of images in a frame of reference centered on the second location ($P_2$);

determine (S8) a relative azimuth ($\theta_3$) of a target point (B) in relation to said element in a frame of reference centred on the second location ($P_2$);

determine (S9) an absolute azimuth ($\theta_B$) of the target point (B) in a frame of reference centred on the second location ($P_2$), by exploiting the absolute azimuth ($\theta_2$) attributed to the at least one element of the at least one ima e of the second series of images and of the relative azimuth ($\theta_3$) of the target in relation to said element.

10. A system according to claim 9, further comprising a receiver of a satellite positioning system.

11. A basic piece of equipment (1) for remotely determining an absolute azimuth of a target point (B), comprising:

means for acquiring (S1) a first series of images in which at least one image of a first visual environment is acquired from a first location ($P_1$) the location coordinates of which are known:

means for associating (S2) the elements of said images with absolute azimuth values in a frame of reference centred on said first location ($P_1$);

means for constituting, (S3) a first image database associated with the location coordinates of the first location ($P_1$);

means for storing energy; and means for transferring (S4) said first image database to a second piece of equipment (2), said second piece of equipment configured to determine said absolute azimuth of said target point (B) by:

acquiring (S5) a second series of images including at least one image of a second visual environment from a second location ($P_2$), the location coordinates of which are known and from which the target point (B) is visible;

determining (S6) at least one point of correspondence between the first image database and at least one image of the second series of images, said at least one point of correspondence corresponding to a common element (A) shared by both the first and second visual environment;

attributing (S7) an absolute azimuth ($\theta_2$) to the common element (A) in a frame of reference centred on the second location ($P_2$);

determining (S8) a relative azimuth ($\theta_3$) of the target point (B) in relation to said common element (A), in the frame of reference centred on the second location ($P_2$); and determining (S9) an absolute azimuth ($\theta_B$) of the target point (B) in the frame of reference centred on the second location ($P_2$) by exploiting the absolute azimuth ($\theta_7$) in the frame of reference centred on the second location ($P_2$) attributed to the common element (A) and the relative azimuth ($\theta_3$) of the target point (B) in relation to said element in the frame of reference centred on the second location ($P_2$).

12. A basic piece of equipment (1) according to claim 11, further comprising a North seeker.

13. A mobile piece of equipment (2) for remotely determining the absolute azimuth of a target point (B), wherein a first series of images is acquired in which at least one image of a first visual environment is acquired from a first location ($P_1$), the location coordinates of which are known, the elements of said images are associated (S2) with absolute azimuth values in a frame of reference centred on said first location ($P_1$), a first image database is constituted (S3), associated with the location coordinates of the first location ($P_1$), said mobile piece of equipment comprising:

a receiver configured to receive said first image database;

a memory configured to store said first image database;

said receiver further configured to receive a second series of images (S5) wherein:
  at least one image of a second visual environment is acquired from a second location ($P_2$), the location coordinates of which are known and from which the target point (B) is visible; and means for processing images and computing means for:

determining at least one point of correspondence between the first image database and at least one image of the second series of images and attributing an absolute azimuth ($\theta_2$) to at least one element of the at least one image of the second series of images in a frame of reference centred on the second location ($P_2$);

determining a relative azimuth ($\theta_3$) of a target point (B) in relation to said element in a frame of reference centred on the second location ($P_2$); and determining an absolute azimuth ($\theta_B$) of the target point (B) in a frame of reference centred on the second location ($P_2$), by exploiting the absolute azimuth ($\theta_2$) attributed to the at least one element of the at least one image of the second series of images and of the relative azimuth ($\theta_3$) of the target in relation to said element.

14. A mobile piece of equipment according to claim 13, comprising an accelerometer and/or a rate gyro.

15. A mobile piece of equipment according to claim 13, comprising graphical and visual man-machine interface means enabling an operator of said second piece of equipment (2) to intervene in remotely determining the absolute azimuth of a target point (B).

* * * * *

UNITED STATES PATENT AND TRADEMARK OFFICE
CERTIFICATE OF CORRECTION

Page 1 of 1

PATENT NO. : 8,965,053 B2
APPLICATION NO. : 14/118887
DATED : February 24, 2015
INVENTOR(S) : Clement Ponssard, Daniel Duclos and Simon Gavillet It is certified that error appears in the above-identified patent and that said Letters Patent is hereby corrected as shown below:

In the Claims,

Column 10, Claim 9, line 27, please delete "imaoe" and insert --image--.

Column 10, Claim 9, line 34, please delete "loocation" and insert --location--.

Column 10, Claim 9, line 42, please delete "confioured" and insert --configured--.

Column 10, Claim 9, line 52, please delete "$\theta_2$)" and insert --($\theta_2$)--.

Column 10, Claim 9, line 27, please delete "ima e" and insert --image--.

Column 11, Claim 11, line 3, please delete "($P_1$)the" and insert --($P_1$), the--.

Column 11, Claim 11, line 34, please delete "($\theta_7$)" and insert --($\theta_2$)--.

Signed and Sealed this
Twenty-ninth Day of September, 2015

Michelle K. Lee
*Director of the United States Patent and Trademark Office*